C. C. SPINKS.
PHOTOGRAPH SHUTTER.
APPLICATION FILED JUNE 30, 1910.
1,003,536.
Patented Sept. 19, 1911.
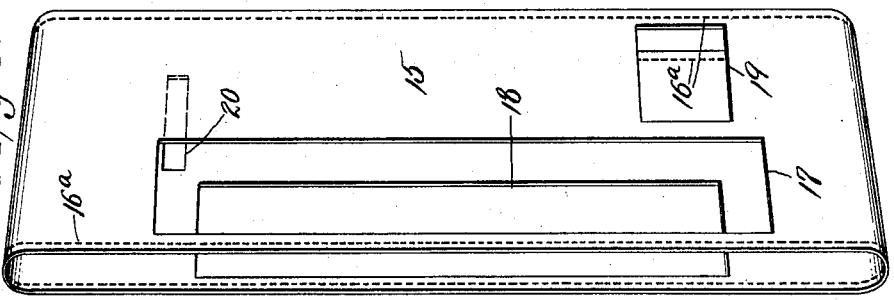
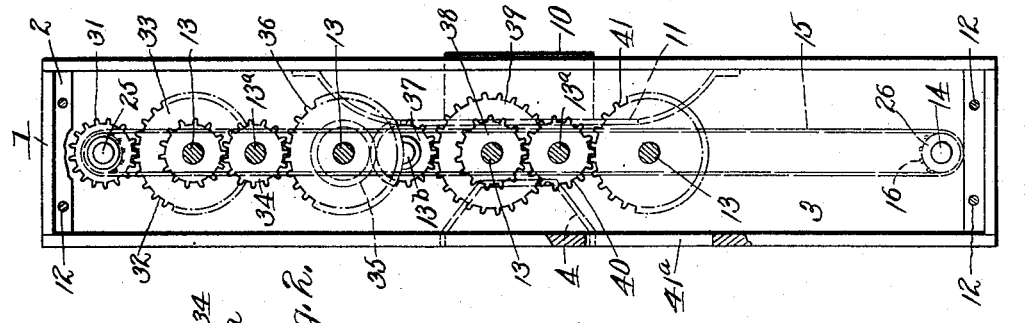

UNITED STATES PATENT OFFICE.

CHARLES C. SPINKS, OF WASHINGTON, DISTRICT OF COLUMBIA, ASSIGNOR TO M. C. SPINKS AND M. A. POOR, OF MEMPHIS, MISSOURI.

PHOTOGRAPH-SHUTTER.

1,003,536. Specification of Letters Patent. Patented Sept. 19, 1911.

Application filed June 30, 1910. Serial No. 569,824.

*To all whom it may concern:*

Be it known that I, CHARLES C. SPINKS, a citizen of the United States, and a resident of the District of Columbia, have invented a new and useful Improvement in Photograph-Shutters, of which the following is a specification.

This invention is adapted for use in connection with cameras, and also in combination with projecting and enlarging devices. The use of the shutter is not limited to the taking of pictures for use in moving picture machines, but is especially adapted for such use, and is also especially adapted for use as a shutter in combination with the projecting apparatus employed in exhibiting moving pictures.

One serious objection to cameras and machines of this type now in use is the vibration due to the stopping and starting of the shutters, and while such vibration is found to some extent even in single exposures, as taken by the ordinary camera, it is especially evident in continuous rapid work, in which the shutter is started and stopped several times per second.

Another object of the invention is to produce a more clearly defined and accurate photograph by providing a shutter in which either the entire surface of the film or plate can be uniformly exposed, or in which the exposure can be varied in order to adapt the same to the conditions under which the exposure is made. For example when photographing a comparatively dark foreground with cloud effects it will be obvious that correct exposure for the first will result in a loss of the cloud effects, and if the exposure is regulated to bring out that portion of the plate above the sky line the foreground will be thin and unexposed.

I am aware of the fact that in making single exposures various devices have been resorted to in order to secure clear definition of both the foreground and the clouds, or light effects, but such devices are not adapted for use in connection with the taking of moving pictures, and especially in cases where the camera itself is being moved during the operation. In photographing landscapes, scenes etc., with the camera mounted upon a train or moving vehicle the conditions are continually changing, and the machine can not be stopped for the purpose of regulating the shutter, or interposing any of the usual devices for regulating the exposure of different parts of the sensitized surfaces.

A still further object of the invention is to obtain a clearly defined image at the edges of the picture as well as at the center, which is not practical in rapid work with a shutter which works from and to a center. With such shutters it is obvious that the portion of the plate opposite said center will receive a greater degree of exposure than any of its other portions.

Another feature of my invention is that the sensitized surface may be held stationary, or it may be moving intermittently, with a variable speed or with a continuous uninterrupted movement, a clear, sharp image being obtained in each case.

With the above objects in view the invention consists of the novel features of construction hereinafter described, pointed out in the claims and shown in the accompanying drawings in which:

Figure 1 is a rear view of the shutter and coöperating parts, a casing being in section. Fig. 2 is a side view, a side plate being removed. Fig. 3 is a perspective view of shutter detached. Fig. 4 is a detailed section on the line 4—4 of Fig. 1.

In these drawings 1 represents the casing or housing for the shutter mechanism, and it will be understood that this housing is to be secured to the front of the camera, or box, or other device in which a movable film is placed, either for the purpose of being exposed, or for the purpose of being projected. This casing is strengthened by corner bracings 2, and divided into a main compartment and into a small end compartment by means of a vertical partition 3. This partition forms a suitable inner support for certain gearing to be hereafter described. A suitable flaring shield is centrally arranged in the rear of the casing, which is cut out for the purpose of receiving said shield, the shield opening into the dark box of the camera or moving picture device when the casing 1 is in place. The shield 4 is provided with suitable ears 5 by which it may be secured either to the casing 1 or directly to the camera. The opening 6 in said shield forms the exposing aperture through which all of the light falling upon the sensitized surfaces, or which is projected through the film must pass.

My shutter consists of an endless traveling curtain 15 which travels upon upper and lower rollers 26, said rollers, or drums being provided with end flanges 27 to prevent endwise movement of the curtain with respect to said drums. This curtain is provided with marginal slots or perforations 16ᵃ which are engaged by teeth 16 carried by the drums 26, in order to impart a positive movement to the curtain. The curtain is provided with a large rectangular opening 17, the width of which is less than one half of the width of the curtain and said opening is situated to one side of the longitudinal center of the curtain. A second opening 18 is also formed upon the same side of the curtain, and is of the same width, but of slightly less length as the opening 17. The opening 17 is employed in order to obtain the greatest and longest exposure of the plate, and the opening 18 is so situated that when the exposure is made the two openings are in alinement with each other and the opening 18 forms the exposure timer of the larger opening. I have found it necessary to have one of these openings longer than the other in order to obtain a sharp image at the edges. Upon the opposite side of the longitudinal center of the curtain are smaller openings, 19 and 20, having the same relative arrangement with respect to each other as the openings 17 and 18.

In order to shift the curtain sidewise to throw either set of openings into alinement with the light aperture I slidably mount the drums or rollers 26 upon shafts 14 and 25 respectively, the shaft 25 being arranged at the top. A key way 28 is formed in the shaft 25, and a key 28ᵃ carried by the upper roller slides in said key way. Fitting loosely over a portion of the shaft and extending through one side of the casing is a sleeve 29. The inner end of the sleeve is provided with an angled flange 30 which engages loosely the flange 27 upon one end of the upper roller 26. Upon the outside of the casing is located a knob formed in two sections, one section 7 having a base 8 which is secured to the casing, and the other section 9 being secured to the sleeve 29. The sleeve slides loosely through the section 7, and the meeting faces of the sections are beveled and toothed, or otherwise roughened so as to interlock. It will be obvious that by drawing the knob section 9 outwardly and giving it a half rotation the curtain will be lifted along the shafts 14 and 25, and by reason of the interlocking of the sections 7 and 9 the curtain will be locked against any accidental creeping or sliding movement along the shafts.

In order to drive the curtain at the proper speed I place between one side of the casing and the partition 3 shafts 13 and stub shafts 13ᵃ, and 13ᵇ. The stub shafts 13ᵃ are secured to the casing 1, and the stub shafts 13ᵇ to the partition 3. Upon the lower shaft 13 I mount a driven gear 41. A suitable opening 41ᵃ is formed in the casing through which can project a suitable gear not shown, of the operating mechanism. In order to transmit motion from the gear 41 to the shaft 25, and obtain the proper speed I interpose between the said gear wheel 41 and a gear wheel 31 fixed upon the shaft a gear train consisting of large gears 39, 36 and 32 upon a portion of the shafts 13, smaller gears 38, 35 and 33 mounted also upon said shafts, and idlers 40 and 34 mounted upon the stub shaft 13ᵇ. By means of this arrangement motion is transmitted from the gear 41 to idler 40, to the gear 38, 39, idler 37, gear 35, 36, idler 34, gear 33, 32, and 31, in the order named.

The curtain can be shifted while the machine is in operation, and this adjustment of the curtain can be made to suit the subject being photographed, and the time of the exposure can also be regulated by varying the speed of travel of the curtain.

What I claim is:

1. In a device of the kind described, a shutter consisting of an endless curtain having openings therein of different sizes, means for producing travel lengthwise, and means for shifting the curtain laterally.

2. A shutter of the kind described consisting of a curtain, said curtain having openings arranged in sets, one set of openings being arranged upon one side of the longitudinal center of the curtain, and the openings of the other set being arranged upon the opposite side of said longitudinal center, means for causing the curtain to travel, and means for shifting the curtain sidewise.

3. In a device of the kind described, the combination with a camera having an opening, of a curtain adapted to travel continuously in one direction, openings being formed in said curtain, said openings being arranged in two sets, the openings of one set being larger than those of the other, means for causing the curtain to travel, and means for shifting the curtain so as to bring either set of openings in alinement with the camera opening.

4. A shutter of the kind described consisting of an endless curtain having longitudinally extending openings formed therein, two of said openings being to one side of the longitudinal center of the curtain, and two upon the opposite side of said center, all of said openings being of different lengths, means for causing said curtain to travel, and means for shifting said curtain sidewise during travel of the curtain.

5. In a shutter of the kind described, parallel shafts, drums slidably mounted upon said shafts, one drum being keyed to one of the shafts, a sleeve loosely connected to said drum, and slidable upon the last mentioned shaft, an endless curtain carried by said drums and having openings therein, and a sectional knob, the meeting faces of said sections being beveled and adapted to interlock, one section being stationary, and the other section being secured to said slidable sleeve.

CHAS. C. SPINKS.

Witnesses:
E. B. McBATH,
PERCY H. MOORE.

Copies of this patent may be obtained for five cents each, by addressing the "Commissioner of Patents, Washington, D. C."